Sept. 8, 1959             A. GRIMAL             2,902,900

STEREO PROJECTION SLIDE MOUNTING DEVICE

Filed Sept. 7, 1955                          2 Sheets-Sheet 1

INVENTOR.
ADOLF GRIMAL.
BY
Robert A. Sloman
ATTORNEY

United States Patent Office 2,902,900
Patented Sept. 8, 1959

2,902,900

STEREO PROJECTION SLIDE MOUNTING DEVICE

Adolf Grimal, Walled Lake, Mich.

Application September 7, 1955, Serial No. 532,829

9 Claims. (Cl. 88—29)

This invention relates to a stereo projector film slide mounting device, and more particularly to mechanism for adjustably positioning a pair of complementary stereo films with respect to a supporting mask for immovably securing the same thereon.

The present mounting device or fixture is made to fit stereo projectors and is adapted to be slidably mounted upon the conventional rail or guide which normally mounts a film slide fixture or may be mounted upon an adaptor which is designed to fit the particular projector.

Heretofore, in the present day mounting of stereo slides, there are difficulties produced due to multiplication of error in the mounting of the pictures so that projection of the image thereof creates much eye strain of the viewer as to a particular composite stereo picture and from one picture to another.

In other words, when the double pictures are projected upon a screen, the images thereof are normally out of superimposition. Therefore, the lenses of the projector must be horizontally and vertically adjusted until you have perfect registry of the two images.

In the meantime, the operator and the audience are straining their eyes watching the two images until proper registry is achieved. Now in the application of the second picture this same readjustment operation is repeated with practically each change of slide, with resulting serious eye strain.

It is, therefore, the primary object of the present invention to provide a stereo projector film slide mounting device which accurately mounts a pair of stereo transparencies of films upon a mask in conjunction with a stereo projector to obtain a predetermined registry thereof so that the mask and film, when thereafter introduced upon the stereo slide of the projector, will at once be accurately set for a perfectly superimposed image.

It is the object of this invention to initially set up the projector with a blank mask or master as to the vertical and horizontal adjustments of the projector for a particular screen distance so that the two images of the pair of apertures of the blank are correctly superimposed upon the screen.

It is the further object of this invention that when the controls are so set, they need not be again adjusted during the setting of a pair of transparencies or films upon a particular mask.

It is the object of this invention to vertically and horizontally adjust a pair of stereo films with respect to a stationary mask whereby their projected images on the screens are in perfect superimposition, after which the films are immovably secured to the mask.

It is the object of this invention to removably clamp the blank mask within the mounting device in a proper predetermined position.

It is the object of this invention to clamp each film upon a separate and independent support, with each such support adapted for independent vertical and horizontal adjustment with respect to the said mask.

It is the further object of this invention to provide a transparent hinged backup plate adapted to loosely bear against the outer surface of the film for maintaining the same flat and at the same time adjustably movable with respect to the stationary mask.

It is the object of the present invention to provide a novel adjusting means for the film clamp slides whereby the said independent stereo films may be separately and independently adjusted horizontally and vertically to thereby achieve a correct superimposition of the projected images upon a screen.

These and other objects will be seen from the following specification and claims in conjunction with the appended drawings, in which:

Figure 1:
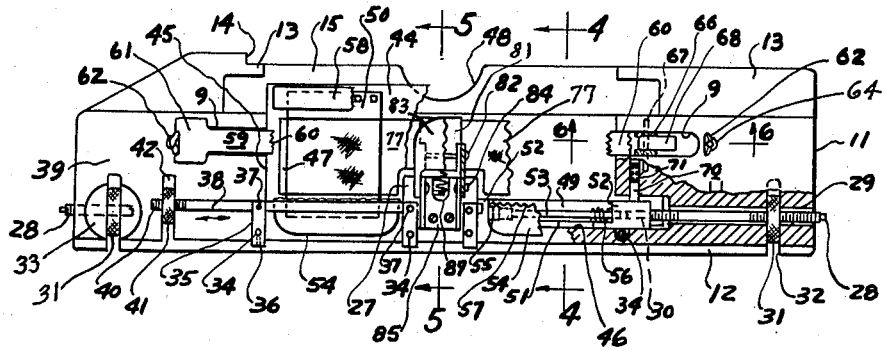
Fig. 1 is a front elevational view partially broken away and sectioned of the present stereo projector film slide mounting device.

It will be understood that the above drawings illustrate merely a preferred embodiment of the invention and that other embodiments are contemplated within the scope of the claims hereafter set forth.

Referring to the drawings, the present film slide mounting device consists of an upright plate 11 having a pair of vertically aligned cut away longitudinal edges at its bottom and top as at 12 and 13 adapted to be slidably received within the opposed guides of a stereo projector. Alternately, the said longitudinal guide edges 12 and 13 may be positioned within an adaptor which is constructed for lateral sliding adjustments into a stereo projector.

The top guide surface 13 terminates adjacent one end in the upright stop 14 to thereby limit by cooperation with a portion of the projector inward positioning of the plate 11 for the film mounting operation.

Figure 4:
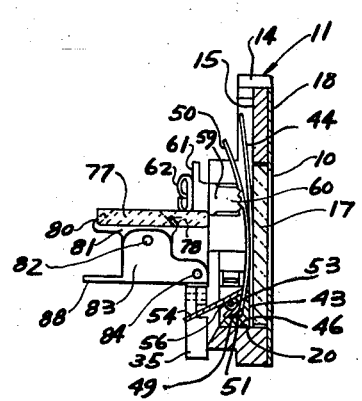
Fig. 4 is a vertical section taken on line 4—4 of Fig. 1.

There is provided upon plate 11 an upright wall 15 which as shown in Fig. 4, terminates in the horizontal ledge 46 adapted to supportably receive in a predetermined position the elongated rectangularly shaped mask 44 whose left hand upright edge is adapted for cooperative registry with the upright wall 45, Fig. 1, to thereby assure a predetermined location for the mask, after which the said mask is secured in position by the clamps 60—61, hereafter described. The said mask has provided therethrough a pair of rectangularly shaped spaced apertures 47 through which the image on the film 50 will register after the said film has been properly adjusted with respect to the said apertures 47 and secured in position as by the strips of tape 58, such as fragmentarily shown in Fig. 1, and hereafter described in further detail.

Figure 2:
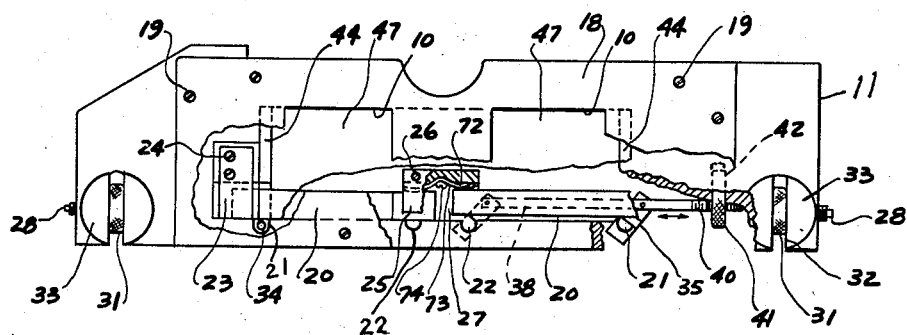
Fig. 2 is a rear elevational view thereof partially broken away in sections, for illustration.
Figure 3:
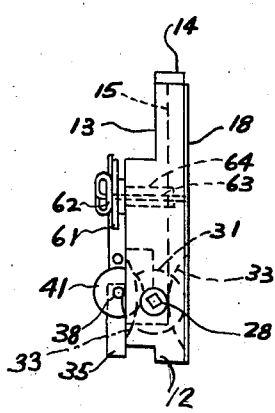
Fig. 3 is a right end elevational view of Fig. 1.

Upright cover plate 18 extends over a substantial portion of the rear surface of plate 11 as shown in the rear elevational view of Fig. 2, and is secured to plate 11 by a series of screws 19 and provides a means for immovably securing transparent glass 17 against the outer rear surface of plate 11. Plate 18 has a pair of spaced and enlarged rectangular apertures 10 which are adapted for horizontal registry with the apertures 47 in mask 44.

Mounted in spaced relation adjacent the bottom wall 46 of plate 11, as shown in Fig. 4, as well as Fig. 1, are a pair of horizontally extending and horizontally spaced adjustable film supports 20, one of which is described hereafter. Film supports 20 are supported adjacent their opposite ends upon the formed cams 21 and 22 and its opposite ends against recessed portions of plate 11 adjacent its lower end as in Fig. 2 and are slidably retained therein by a pair of upright gibs 23, one of which is shown in Fig. 2, and which is secured to the rear surface of plate 11 as by the fasteners or screws 24.

The inner ends of the two film supports also register with the rear surface of the upright wall 27 and are slidably retained in the upright position shown as by the central gib 25 which is secured by screws 26 to the rear surface of plate 27, but in spaced relation thereto so as to cooperatively receive the corresponding inner ends of the said film supports 20. A pair of longitudinally aligned independent threaded shafts 28 are loosely nested within elongated slots 29 formed within plate 11, and the inner ends of the said shafts 28 are secured respectively to the outer ends of the film supports 20 as at point 30, Fig. 1.

Plate 11 has formed adjacent its ends the upright transverse slots 32 within which are rotatively positioned the knurled nuts 31 which receive and are in threaded engagement with the said shafts 28. The opposite faces of plate 11 in registry with nut 31 are concaved into finger and thumb receiving sockets 33 to facilitate manual application of the nut 31 for rotating the same in one direction or the other to thereby effect longitudinal adjustments in one of two directions of shaft 28 and accordingly of the film support 20 secured thereto. Each of the shafts 28 are independent of each other and accordingly there is thus provided separate independent manual adjustments for the two film supports 20.

Vertical adjustment control for film supports

The said cams 21 and 22 of Fig. 2 are carried upon the transverse shafts 34 which extend through corresponding openings in plate 11 and are rotatable therein. Upon the front side of plate 11 there are provided for each of the said supports a pair of spaced upright arms 35 which are secured at their lower ends to the said shafts 34 which are secured thereto as by the set screws 36, or in any other convenient manner.

The upper ends of the arms 35 are pivotally connected respectively as at points 37 to spaced portions of the longitudinal shaft 38. Accordingly, the said arms 35 provide a support for the said shafts 38, of which there are two, arranged in longitudinal alignment upon the front face of plate 11. The respective edges of the shafts 38 bear against the outer upright edge faces 39 formed in plate 11 and their threaded ends 40 are threaded through the manually adjustable knurled nuts 41 which are arranged transversely of the wall 39 and are positioned within the upright slots 42 formed therein whereby the said nuts are retained against longitudinal movement. Accordingly, upon manual rotation of the said nuts 41, there will be effected independent longitudinal adjustments in one direction or the other of said shafts 38.

This will result in tilting movements of the arms 35 in unison to thereby effect corresponding slight rotary movements of the shafts 34 which carry the film support cams 21 and 22. Accordingly, there is provided separate manually operable controls for adjusting each of the film supports vertically.

By viewing the projected images of the film as mounted in the present device in the manner hereafter described, the said images may be superimposed upon each other by the horizontal and vertical respective adjustments of the said film supports by employing the horizontal control nuts 31 and, secondly, the vertical control nuts 41.

Referring to Fig. 4, the upright forward wall 43 of support 20 is arranged forwardly of glass 17 to provide clearance for mask 44 and its pair of spaced apertures 47.

The upright central mask receiving wall portion 15 has a central concave recess 48 formed therein to facilitate access of the hand to the said mask 44 for removing the same when desired and upon release of the clamps 60—61.

Adjustable film supports

The front wall of each of the supports 20 is tapered as at 49, Figs. 1 and 4, to cooperatively receive the lower edge portions respectively of the transparencies or films 50 for properly positioning the same against mask 44 in the manner shown in Fig. 4.

Each of the film supports 20 have spaced end block formations 52 between which extend the horizontally disposed stationary shafts 53. The inclined surfaces 49 of the said supports terminate at their lower ends in the horizontally disposed portions 51 upon which the said films 50 rest.

Clamp plates 54 are respectively positioned upon each of the film supports 20 and have at their opposite edges depending apertured ears 55 which cooperatively receive portions of the shaft 53, said plates 54 terminating at their inner longitudinal edge in the serrated film gripping edges 57 for operatively engaging the said film and securing the same against the upright portion 49 of the said film holders.

A pair of spaced coil springs surround each of the respective shafts 53 with one end of the spring engaging the said support and the other free end of the spring as at point 56 engaging the under surface of the clamping plate 54 for normally biasing the same into the film securing position shown in Fig. 4.

Once the said films 50 as loosely positioned against mask 44 have been properly adjusted vertically as well as horizontally in the manner above described upon their respective supports 20, to which they are secured by the clamp plates 54, a strip of adhesive material, such as Scotch tape or adhesive tape 58, is mounted over the upper longitudinal edges of the film and secured to adjacent portions of the mask 44, as fragmentarily shown at 58 (Fig. 1). This anchors the said films in corrected adjusted positions with respect to the mask. After removal of the said mask a second strip of adhesive tape or the like may be applied to the lower portions of the said film for finally securing the same in a permanent position with respect to the mask.

Film mask clamping structure

Mounted upon the body 11 adjacent front wall 39 are a pair of horizontally spaced clamps 59 whose inner serrated adges 60 are adapted to operatively engage and retain the said mask 44 against the upright bearing surface 15, where the said mask remains during the adjusting operation of the respective films in and upon their supports 20.

Figure 6:
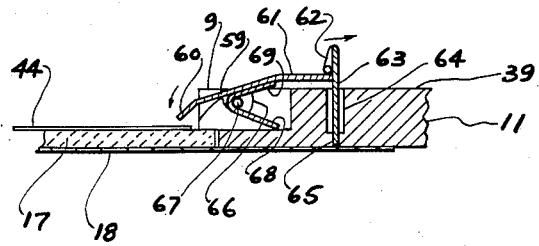
Fig. 6 is a fragmentary horizontal section taken on line 6—6 of Fig. 1.

Each of the clamps 59 have a pair of central depending ears 66 which are transversely apertured to permit pivotal mounting of the said clamps upon the transverse pins 67 shown in Fig. 6 which extends across the horizontally disposed slots 9 formed in the said wall 39 in providing clearance for clamps 59 respectively. The spring 68 is looped around pin 67 and at its free end engages the base portion of the slot 9 forming a part of the body 11. The opposite end of said spring as at 69 operatively engages the under surface of clamp 59 normally biasing the same in a counterclockwise direction as viewed in Fig. 6, tending to hold the serrated edge 60 into clamping engagement with mask 44.

In Fig. 6, however, the clamp has been disengaged from the mask to permit removal of the mask. For this purpose clamp 59 has an outer enlarged end plate 61 which in clamping position is spaced slightly outward from the surface 39 of the body.

The resilient spring steel wire or snap lock 63 extends into the aperture 64, Fig. 6, formed in the said body and is anchored to the body as at 65. The free end of the said wire 63 is reverse turned as at 62 and, as shown in Fig. 6, is adapted to retain the said clamp in released position with the plate enlargement 61 in contact with the surface 39, as shown in Fig. 6.

In order to release the said clamp for clamping operation, it is necessary to manually deflect laterally in the direction of the arrow, Fig. 6, the overhang portion 62 of the latch 63 to thereby release the said clamp which under the action of spring 68—69 automatically rotates the clamp 59—60 in the counterclockwise direction indicated by the arrow into clamping engagement with mask 44.

*Support hold-down structure*

Referring to Fig. 1, wherein a portion of the body 11 is cut away, there is shown adjacent the end blocks 52 of support 20 and thereabove an upright slot within which the plunger 70 is positioned with a coiled spring 71 interposed in the slot normally urging the said plunger downwardly into operating engagement with the corresponding portion of the film support for holding the same upon the outer of the cam supports, i.e., cam supports 21, Fig. 2. The same structure is employed for the outer edges of both of the said block formations 52 at the outer ends of the supports 20.

The gib plate 25 is undercut at 72 and houses therein the formed double leaf spring 73 which is secured as at 74, with the free end portions of the said spring operatively bearing down upon the opposed inner end portions of the said supports 20 normally maintaining the same in operative engagement with the inner of the said supporting cams 22.

Figure 5:
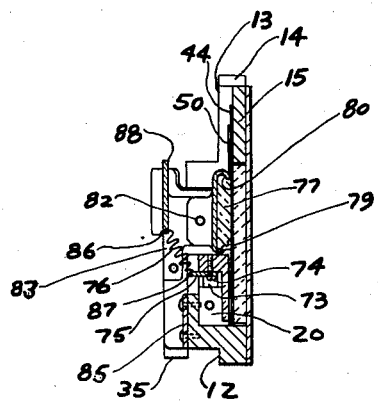
Fig. 5 is a vertical section taken on line 5—5 of Fig. 1.

As viewed in Fig. 5, spring 73 has a central projection 75 to which the free end of coiled spring 76 is anchored as at point 87. Said spring at its outer end as at point 86 is joined to the support 83 which carries the transparent pressure plate 77 for normally maintaining the film 50 and the said mask 44, as shown in Fig. 4, into snug contact with the said wall 15 and with the film flat against mask 44.

*Film pressure plate*

The said pressure plate 77 is of a transparent material, such as plastic, and is centrally undercut at 78 to receive the central clamping structure 79 and 80. The clamp body 81 has an oversized transverse aperture adapted to loosely receive the horizontally disposed mounting pin 82 which is carried by the pivotal body 83, said body being bifurcated at its upper end to receive central portions of the clamp 81.

The support 83 is also bifurcated at its lower end and has a pair of depending legs which extend around upright plate 85 and is pivotally mounted thereon at its upper end as by the pivot 84. The said plate has a transverse slot 89 at its upper end to provide clearance for coiled spring 87.

The support 83 has a projection 88 at its upper end to facilitate the swinging of said support from the upright position shown in Fig. 5 to the outwardly projected open position of Fig. 4.

The coiled spring 76 is so interconnected with the support 83 as to facilitate snap opening thereof, as well as a snap closing thereof, and the backup plate 77 after the respective end connections of spring 76 pass dead center with respect to the pivotal mounting 84 of the said holder.

By this construction, when the holder 83 is pivoted to the upright position shown in Fig. 5 and maintained in that position by spring 76, the pressure plate 77 cooperatively bears against films 50 and the mask 44 for maintaining the same in the upright position shown in Fig. 5. The loose mounting of the pressure plate holder clamp 81 with respect to its pivot 82 provides for self-alignment of the said pressure plate as the same closes to the position shown in Fig. 5.

Having described my invention, reference should now be had to the claims which follow for determining the scope thereof:

I claim:

1. A stereo projector film slide mounting device comprising an upright elongated body having a pair of horizontally spaced apertures, said body having a recessed supporting ledge adapted to receive a correspondingly apertured upright mask in a predetermined position, a pair of longitudinally spaced releasable clamps carried on said body adapted to retainingly engage opposite ends of said mask, a pair of horizontally extending longitudinally spaced film supports movably mounted within said body adjacent the lower ends of its apertures and rearwardly of said mask, pairs of longitudinally spaced rotatable cams on said body mounting each of said supports respectively, means resiliently holding down each support upon a pair of cams, a pair of spaced aligned longitudinally adjustable shafts mounted on said body respectively connected with said pairs of cams for rotating the same to vertically adjust said supports independently relative to said mask, a film clamp on each support adapted to hold a pair of stereo films in an upright position against said mask over its apertures, and a second pair of spaced aligned longitudinally adjustable shafts extending through portions of said body with the inner end of each shaft secured to a film support for effecting independent lateral adjustments thereof relative to said mask, said adjustments being made with said body mounted within the slide mount opening of a stereo projector, whereby the projected images of said films may be accurately superimposed and whereby said films may be secured in said adjusted positions upon said mask.

2. The mounting device of claim 1, each clamp including an elongated plate swivelly mounted upon said body, resilient means normally urging one end of said plate into mask gripping position, and a resilient latch mounted upon and transversely of said body adapted to overlie and retainingly engage the other end of the plate for maintaining the same in disengaged position against the action of said resilient means, said latch being laterally movable manually to disengage said plate for automatic clamping engagement with said mask.

3. The mounting device of claim 1, a transparent pressure plate pivotally mounted on said body and adapted for operative parallel engaging relation with portions of said films for loosely holding them against said mask, and resilient means interconnecting said pressure plate and body normally urging said pressure plate against said films.

4. The mounting device of claim 1, a transparent pressure plate pivotally mounted on said body and adapted for operative parallel engaging relation with portions of said films for loosely holding them against said mask, and resilient means inter-connecting said pressure plate and body normally urging said pressure plate against said films, the pivotal mounting of said pressure plate being so related to the end connections of said resilient means with said body and plate that, upon passing dead center relatively to said pivotal mounting in either direction, said plate will snap into either film engaging position or fully open position at right angles thereto.

5. The mounting device of claim 1, a swingable support pivotally mounted upon said body rearwardly of said film supports, a coiled spring interconnecting said support and body, and an elongated transparent pressure plate loosely and swivelly mounted upon said support adapted for operative parallel engaging relation with rear portions of said films for loosely holding them against said mask.

6. The mounting device of claim 1, each film support having a pair of upright blocks at its opposite ends, a shaft extending between the blocks of each support, said film clamp including an elongated plate serrated on one longitudinal edge and pivotally mounted on said shaft, and resilient means on said shafts anchored against said supports and operatively engaging said clamp plates.

7. The mounting device of claim 1, a parallelogram type of linkage interconnecting spaced portions of a particular shaft with corresponding cams for one support, and a manually rotatable nut threaded on each shaft and retained by said body against longitudinal movement, whereby longitudinal adjustments of said shafts will effect rotary movement in unison of said cams and correspondingly vertical adjustments of the particular support.

8. The mounting device of claim 1, and a manually operable nut threaded on the outer ends respectively of said shafts and loosely retained by said body against longitudinal movement.

9. The mounting device of claim 1, and a transparent glass nested in the front wall of said body forwardly of and in supporting engagement with said mask.

References Cited in the file of this patent
UNITED STATES PATENTS

| | | |
|---|---|---|
| 2,289,843 | Koch et al. | July 14, 1942 |
| 2,704,566 | Thompson et al. | Mar. 22, 1955 |
| 2,752,712 | Hase et al. | July 3, 1956 |
| 2,853,792 | Lutes | Sept. 30, 1958 |